US010277755B2

United States Patent
Yoshimura et al.

(10) Patent No.: US 10,277,755 B2
(45) Date of Patent: Apr. 30, 2019

(54) ELECTRONIC DEVICE AND MARKER PROCESSING METHOD

(71) Applicant: KYOCERA Document Solutions Inc., Osaka (JP)

(72) Inventors: Sachiko Yoshimura, Osaka (JP); Akihiro Umenaga, Osaka (JP); Yumi Nakagoshi, Jr., Osaka (JP); Naoto Hanatani, Osaka (JP); Hironori Hayashi, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/540,788

(22) PCT Filed: Feb. 6, 2017

(86) PCT No.: PCT/JP2017/004267
§ 371 (c)(1),
(2) Date: Jun. 29, 2017

(87) PCT Pub. No.: WO2017/150084
PCT Pub. Date: Sep. 8, 2017

(65) Prior Publication Data
US 2018/0376008 A1    Dec. 27, 2018

(30) Foreign Application Priority Data
Feb. 29, 2016    (JP) .................................. 2016-038374

(51) Int. Cl.
*H04N 1/60*    (2006.01)
*H04L 12/58*    (2006.01)
(Continued)

(52) U.S. Cl.
CPC ......... *H04N 1/00212* (2013.01); *H04L 51/28* (2013.01); *H04N 1/00* (2013.01);
(Continued)

(58) Field of Classification Search
CPC ....... G06K 2009/3225; G06K 9/00664; G06K 9/3216; G06K 2209/01; G06K 9/00442;
(Continued)

(56) References Cited

U.S. PATENT DOCUMENTS

| 5,825,947 | A | * | 10/1998 | Sasaki | G06K 19/06037 |
| | | | | | 382/321 |
| 5,974,171 | A | * | 10/1999 | Hayashi | G06K 19/06009 |
| | | | | | 382/162 |
| 2008/0301771 | A1 | * | 12/2008 | Kawai | G06F 21/125 |
| | | | | | 726/2 |

(Continued)

FOREIGN PATENT DOCUMENTS

JP    2005-167875 A    6/2005

*Primary Examiner* — Negussie Worku
(74) *Attorney, Agent, or Firm* — IP Business Solutions, LLC

(57) ABSTRACT

An electronic device includes an image reading section, a marker detection section, and a processing section. The marker detection section analyzes image data and detects a first marker portion indicated in the image data and a second marker portion indicated in the image data in a mode different from a mode of the first marker, and also extracts texts indicated in the first marker portion and the second marker portion. The processing section performs processing of transmitting the image data where the text indicated in the first marker portion is defined as a file name of the image data and the text indicated in the second marker portion is defined as a transmission address to which the image data is transmitted.

16 Claims, 8 Drawing Sheets

(51) Int. Cl.
*H04N 1/387* (2006.01)
*H04N 1/00* (2006.01)

(52) U.S. Cl.
CPC ......... *H04N 1/00225* (2013.01); *H04N 1/387* (2013.01); *H04N 1/6072* (2013.01)

(58) Field of Classification Search
CPC .... G06K 9/2063; G06Q 20/102; G06Q 30/06; G06Q 30/0601; G06T 7/73; G09B 29/007; G08G 1/0175; G08G 1/087
USPC ....................................................... 358/1.15
See application file for complete search history.

(56) References Cited

U.S. PATENT DOCUMENTS

| | | | |
|---|---|---|---|
| 2009/0240519 A1* | 9/2009 | Ichikawa | G06Q 10/06 705/305 |
| 2014/0023671 A1* | 1/2014 | Nakamura | A61K 39/0011 424/185.1 |
| 2014/0255437 A1* | 9/2014 | Nakamura | C12N 9/1205 424/185.1 |
| 2016/0050173 A1* | 2/2016 | Nakamura | H04N 1/00103 709/206 |
| 2016/0072967 A1* | 3/2016 | Yoshimura | H04N 1/00973 358/1.15 |
| 2016/0307075 A1* | 10/2016 | Yoshimura | H04N 1/10 |
| 2016/0364191 A1* | 12/2016 | Akuta | G06F 3/1238 |
| 2017/0076070 A1* | 3/2017 | Bridges | G06F 19/00 |
| 2017/0315963 A1* | 11/2017 | Hanatani | G06F 17/211 |
| 2017/0374001 A1* | 12/2017 | Ifrim | H04L 43/045 |
| 2018/0005065 A1* | 1/2018 | Yoshimura | G06F 17/2735 |
| 2018/0198937 A1* | 7/2018 | Yoshizawa | H04N 1/00702 |

* cited by examiner

Fig.6

| MARKER REGISTRATION | | | | |
|---|---|---|---|---|
| ■ADDRESSES | TO ADDRESS: | RED | READING REGISTRATION | |
| | CC ADDRESS: | BLUE | READING REGISTRATION | |
| | BCC ADDRESS: | GREEN | READING REGISTRATION | |
| ■SUBJECT | | YELLOW | READING REGISTRATION | |
| ■FILE NAME | | ORANGE | READING REGISTRATION | |
| | | | OK | CANCEL |

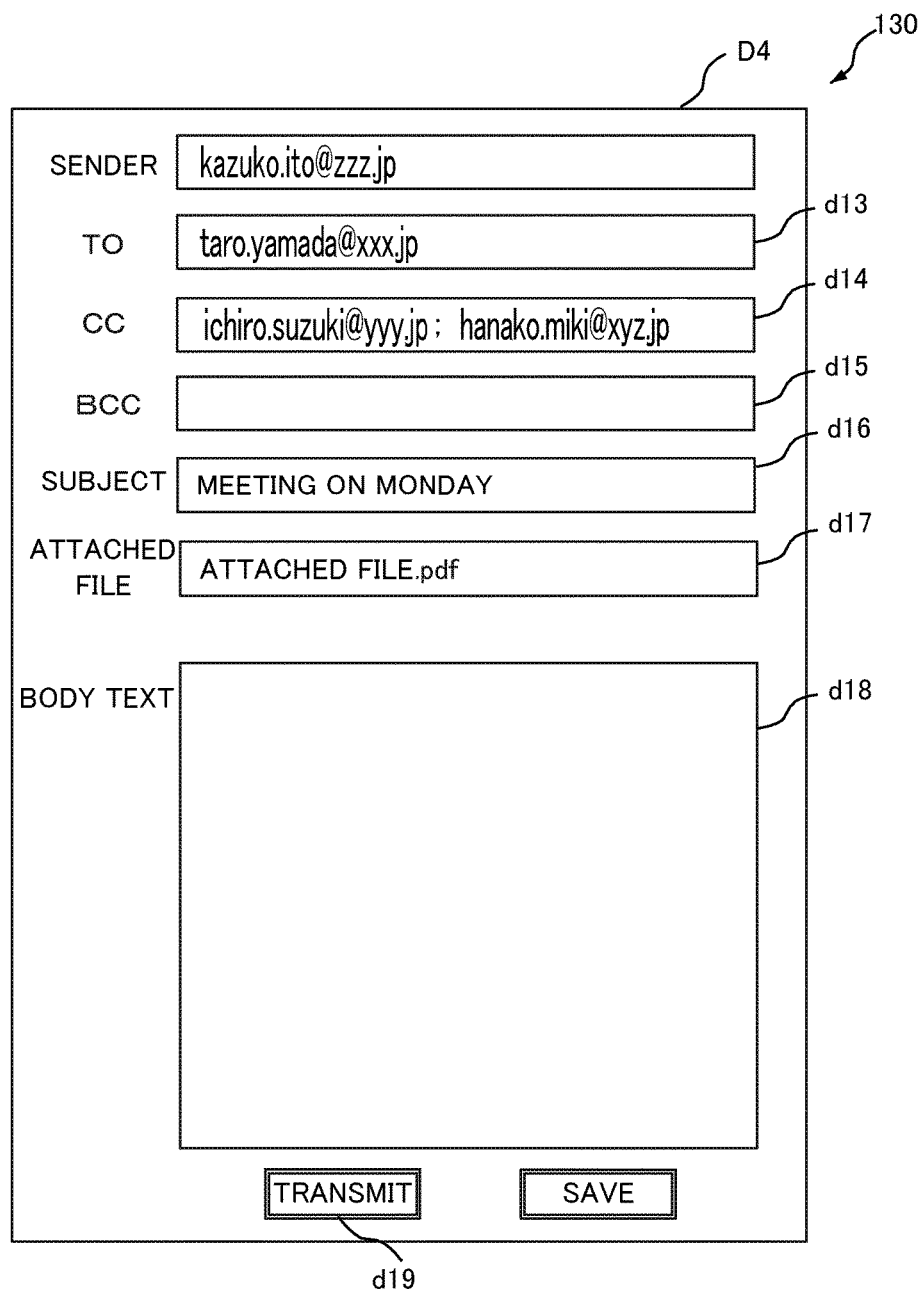

ELECTRONIC DEVICE AND MARKER PROCESSING METHOD

TECHNICAL FIELD

The present invention relates to a technology of extracting a marker portion marked with a marker pen from image data.

BACKGROUND ART

Patent Literature 1 below discloses a technology of determining whether or not a marker portion is included in a document to be read and deleting an image indicated by this marker portion, if any is included, or replacing the aforementioned image with a monochromatic image. With this technology, the user can mark a desired region within the document with a marker pen to thereby remove the region from a target to be read by an image reader.

PRIOR ART LIST

Patent Document

Patent Document 1: Japanese Patent Application Laid-Open No. 2005-167875

SUMMARY OF INVENTION

Problem to be Solved by the Invention

The image data of the document read by the image reader is transmitted via an e-mail or saved into a storage section such as a hard disk drive (HDD) in some cases. In this case, a user is required to input a transmission address, for example, a mail address as an address of the e-mail or a directory name as a storage destination of the storage section. The user is also required to input a file name of the image data of the document.

However, it is bothersome to input, for example, the transmission address and the file name of the image data described above by using a touch panel or a hard key provided in the image reader, which is disadvantageous in terms of user-friendliness.

In view of the aforementioned circumstance, the present invention has been made, and it is an object of the invention to, upon transmission of image data of a document, enable the transmission of the image data through marking with a maker pen without inputting a transmission address and a file name of the image data.

Means for Solving the Problem

An electronic device according to one aspect of the present invention includes: an acquisition section acquiring image data indicating a document; a marker detection section analyzing the image data and detecting a first marker portion indicated in the image data and a second marker portion indicated in the image data in a mode different from a mode of the first marker, and also extracting texts indicated in the first marker portion and the second marker portion; and a processing section performing processing of transmitting the image data where the text indicated in the first marker portion is defined as a file name of the image data and the text indicated in the second marker portion is defined as a transmission address to which the image data is transmitted.

Moreover, a maker processing method according to another aspect of the invention includes: an acquisition step of acquiring image data indicating a document; a marker detection step of analyzing the image data and detecting a first marker portion indicated in the image data and a second marker portion indicated in the image data in a mode different from a mode of the first marker, and also extracting texts indicated in the first marker portion and the second marker portion; and a processing step of performing processing of transmitting the image data where the text indicated in the first marker portion is defined as a file name of the image data and the text indicated in the second marker portion is defined as a transmission address to which the image data is transmitted.

Advantageous Effects of the Invention

With the present invention, it is possible to, upon transmission of image data of a document, enables the transmission of the image data through marking with a maker pen without inputting a transmission address and a file name of the image data.

BRIEF DESCRIPTION OF THE DRAWINGS

FIG. 6 is a diagram illustrating one example of a marker registration screen displayed at a display section of the image reader as one example of the electronic device according to one embodiment of the invention.

FIG. 8 is a diagram illustrating one example of a file transmission screen displayed at the display section of the image reader as one example of the electronic device according to one embodiment of the invention.

DESCRIPTION OF THE EMBODIMENTS

Hereinafter, an electronic device and a marker processing method according to one embodiment of the present invention will be described with reference to the drawings.

Figure 1:
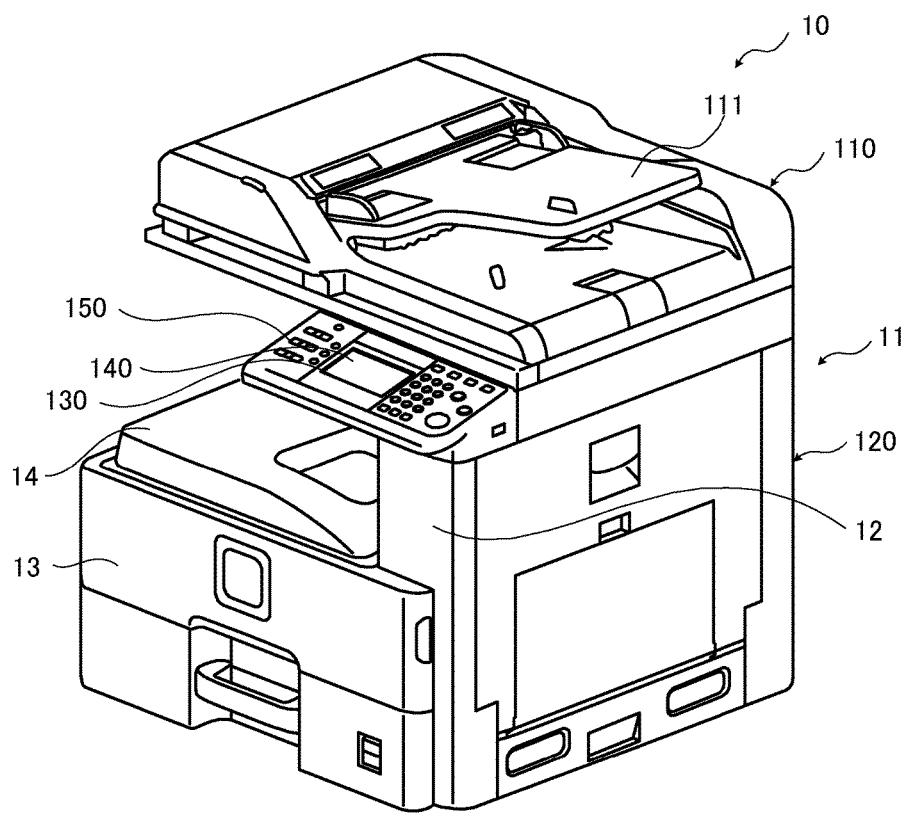
FIG. 1 is a perspective view illustrating an image forming apparatus including an image reader as one example of an electronic device according to one embodiment of the present invention.
Figure 2:
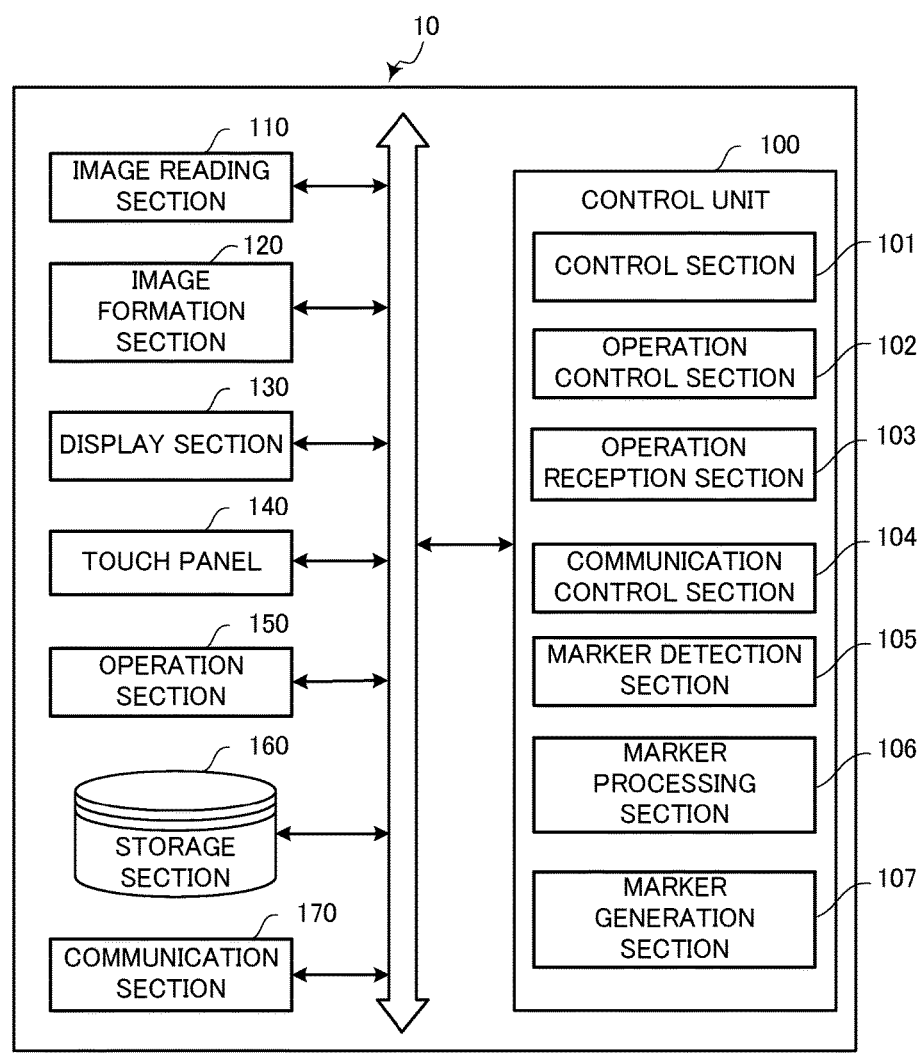
FIG. 2 is a block diagram illustrating inner configuration of the image forming apparatus including the image reader as one example of the electronic device according to one embodiment of the invention.

FIG. 1 is a perspective view illustrating an image forming apparatus including an image reader as one example of the electronic device according to one embodiment of the invention. FIG. 2 is a block diagram illustrating inner configuration of the image forming apparatus.

The image forming apparatus 10 is a multifunction peripheral combining together a plurality of functions such as, for example, a copy function, a printer function, a scanner function, and a facsimile function. The image forming apparatus 10 is roughly composed of: an apparatus body 11; an image reading section 110 which is arranged above the apparatus body 11; and a coupling section 12 which is provided between the image reading section 110 and the apparatus body 11.

The apparatus body 11 includes an image formation section 120, a paper feed section 13, etc.

To perform image reading operation by the image forming apparatus 10, the image reading section 110 (acquisition section) sequentially reads a bulk of documents loaded on a document loader 111 to generate image data composed of a plurality of pages under control by a operation control section 102 to be described later on. This image data is stored into a storage section 160. Note that, instead of acquiring the image data through the reading of the bulk of the documents by the image reading section 110, the image forming apparatus 10 may acquire the image data indicating the document through reception of the image data from another information processor such as a personal computer (PC) by a communication section 170.

To perform image formation operation by the image forming apparatus 10, based on, for example, the image data stored in the storage section 160, the image formation section 120 forms a toner image on recording paper fed from the paper feed section 13 under control by the operation reception section 102. Then the toner image formed on the recording paper is thermally fixed by a fixing section, not illustrated. The recording paper on which the image has already been formed and which has already been subjected to fixing processing is discharged onto a discharge tray 14.

A display section 130 and an operation section 150 are arranged at a front of a casing forming an outline of the image forming apparatus 10. The display section 130 includes a liquid crystal display (LCD) or an organic light-emitting diode (OLED) display. The display section 130 displays, for example, a menu screen under control by the operation reception section 102.

A touch panel 140 is arranged on a front surface of the display section 130. The touch panel 140 is a touch panel of a so-called resistance film type or capacitance type, which detects user' contact (touch) on the touch panel 140 together with a position of the aforementioned contact.

The operation section 150 is a hard key including, for example, a menu key for calling up a menu, arrow keys for moving a focus of a GUI forming the menu, and a determine key for performing confirmation operation on the GUI forming the menu.

The storage section 160 is a large-capacity storage device such as an HDD.

The communication section 170 is a network interface formed of a communication module such as a wireless LAN board.

The image forming apparatus 10 further includes a control unit 100. The control unit 100 is composed of: a central processing unit, a random access memory (RAM), a read only memory (ROM), etc. The control unit 100 functions as a control section 101, the operation control section 102, an operation reception section 103, a communication control section 104, a marker detection section 105, a marker processing section 106, and a marker registration section 107 as a result of execution of programs stored in the aforementioned ROM or storage section 160 by the aforementioned CPU. Note that each of the aforementioned structures of the control unit 100 may be formed of a hard circuit without depending on program-based operation.

The control section 101 performs overall operation control of the image forming apparatus 10.

The operation reception section 103 has a function of receiving, based on a detection signal outputted from the touch panel 140, user operation performed on the touch panel 140. The operation reception section 103 also has a function of receiving user operation performed by using the operation section 150 such as the hard key.

The communication control section 104 has a function of controlling communication operation performed by the communication section 170. The communication section 170 transmits image data to another image processor such as the personal computer (PC) under control by the communication control section 104.

The operation control section 102 has a function of controlling the image reading operation performed by the image reading section 110, display operation performed by the display section 130, etc.

The marker detection section 105 has a function of analyzing image data acquired through the document reading by the image reading section 110 and detecting a marker portion of the document marked with a marker. The marker detection section 105 also has a function of extracting a text indicated in the detected marker portion.

The marker processing section 106 has a function of causing the communication section 170 to transmit image data via an e-mail and causing the storage section 160 to store the image data by using information indicated in the text extracted by the marker detection section 105.

The marker registration section 107 has a function of receiving setting or alteration of each of first to fifth colors of markers to be described later on.

Figure 3:
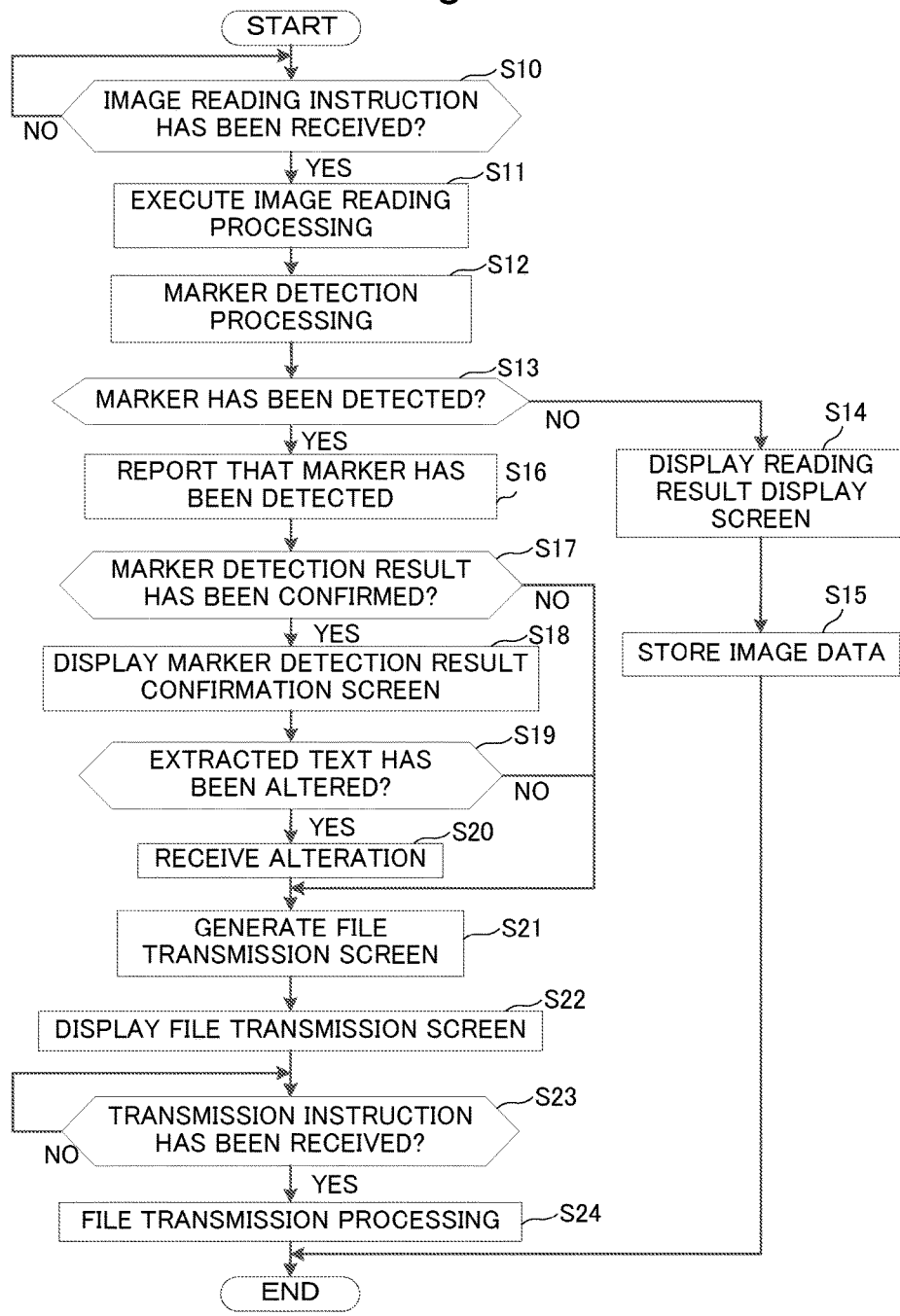
FIG. 3 is a flowchart illustrating a flow of operation performed by the image reader as one example of the electronic device according to one embodiment of the invention.

Next, the image reading operation performed by the image forming apparatus 10 including the aforementioned configuration will be described. FIG. 3 is a flowchart illustrating a flow of the image reading operation performed by the image forming apparatus 10.

Upon receiving an image reading instruction by the operation reception section 103 (YES in step S10), the operation control section 102 controls the image reading section 110 to execute the image reading operation (step S11). Through this processing in S11, the image reading section 110 acquires image data indicating a document.

Figure 4:
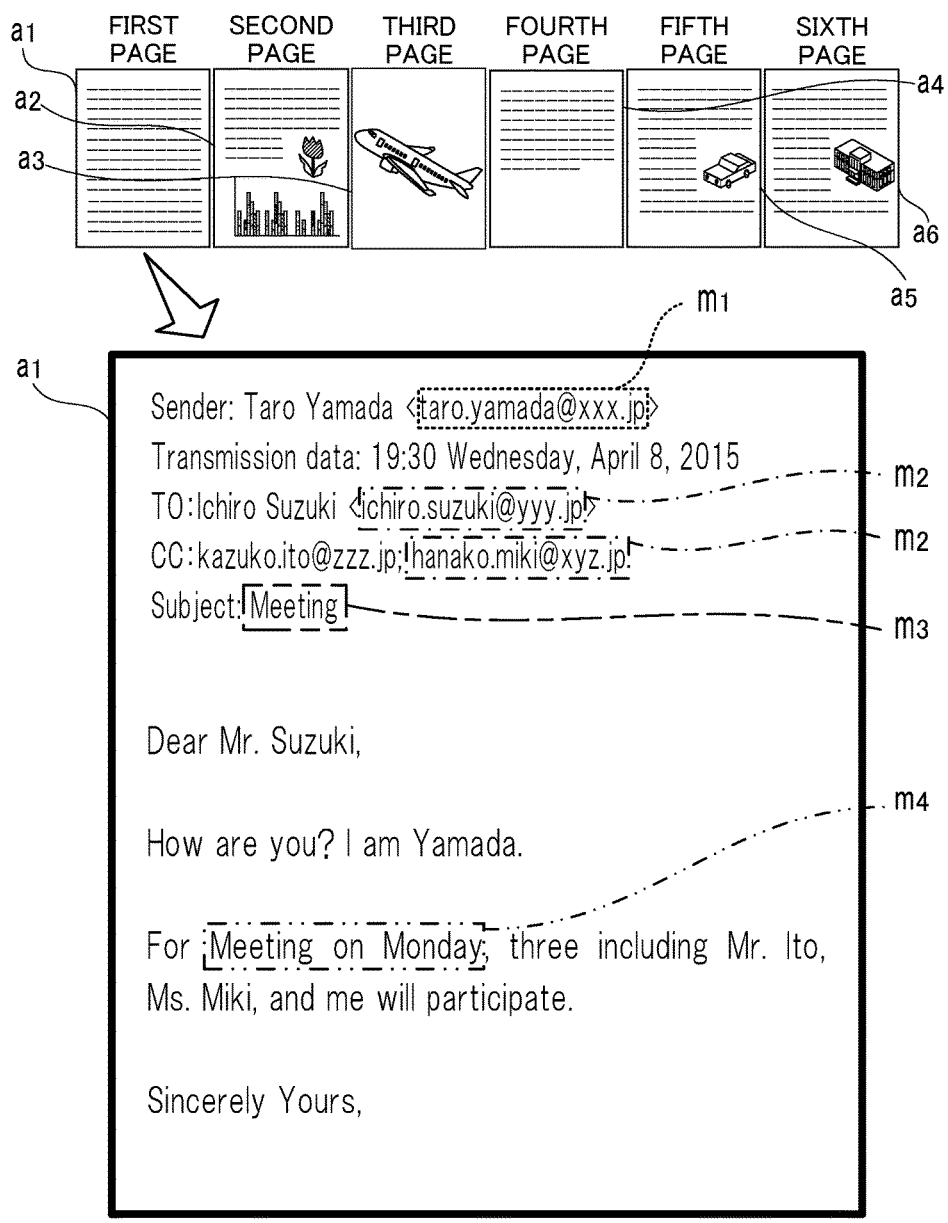
FIG. 4 is a diagram illustrating one example of image data acquired by the image reader as one example of the electronic device according to one embodiment of the invention.

FIG. 4 is a diagram illustrating one example of the image data acquired by the image reading section 110. The example illustrated in the figure refers to a case where six documents are loaded on the document loader 111, and the image reading section 110 acquires the image data composed of six pages, i.e., image data a1 to a6.

Referring back to FIG. 3, the marker detection section 105 analyzes the image data acquired by the image reading section 110 through the processing in step S11, and performs marker detection processing of detecting a marker portion included in the image data (step S12). The marker detection section 105 also extracts a text indicated in the detected marker portion.

In the example illustrated in FIG. 4, the first document loaded on the document loader 111 is provided with a plurality of markings with marker pens, as a result of which the image data a1 on the first page includes a plurality of marker portions (portions surrounded by dotted lines in the figure). The portion surrounded by the dotted line m1 indicates the marker portion marked in red, the portion surrounded by the dotted line m2 indicates the marker portion marked in blue, the portion surrounded by the dotted line m3 indicates the marker portion marked in orange, and the portion surrounded by the dotted line m4 indicates the marker portion marked in yellow.

Figure 5:
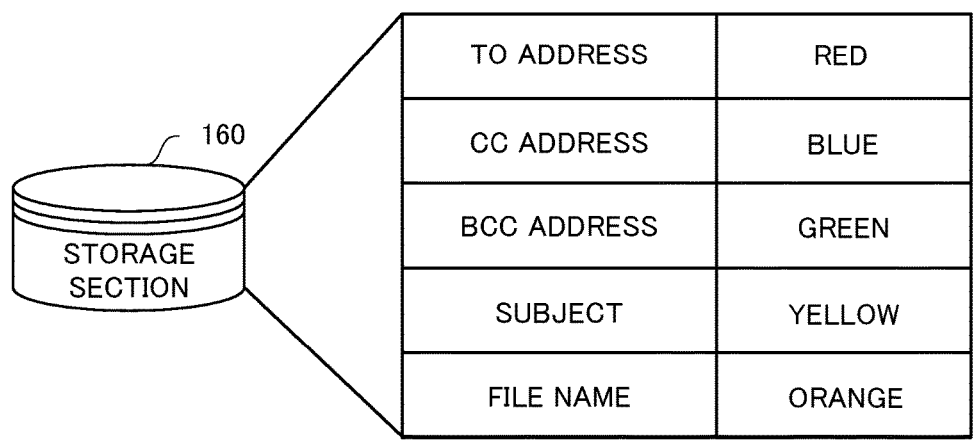
FIG. 5 is a diagram illustrating one example of data stored in a storage section of the image reader as one example of the electronic device according to one embodiment of the invention.

FIG. 5 is a diagram illustrating one example of data stored in the storage section 160. As illustrated in this figure, the storage section 160 previously stores a marker color table indicating colors of markers respectively corresponding to a TO address, a CC address, a BCC address, and a subject of an e-mail and a file name of the image data.

For example, red is previously set as the color corresponding to the TO address of the e-mail. The marker detection section 105 detects, as the first marker portion, a red-colored straight line of a width equal to or greater than a predefined length in the document. Then the marker detection section 105 extracts, as a text indicating the TO address of the e-mail, a text "taro.yamada@xxx.jp" indicated in the first marker portion.

Moreover, blue is previously set as the color corresponding to the CC (carbon copy) address of the e-mail. The marker detection section 105 detects, as the second marker portion, a blue-colored straight line of a width equal to or greater than a predefined length in the document. In the example illustrated in FIG. 4, the marker detection section 105 detects the two second marker portions. Then the marker detection section 105 extracts, as texts indicating the CC addresses of the e-mail, texts "ichiro.suzuki@yyy.jp" and "hanako.miki@xyz.jp" respectively indicated in the two second marker portions.

Moreover, green is previously set as the color corresponding to the BCC (blind carbon copy) address of the e-mail. The marker detection section 105 detects, as the third marker portion, a green-colored straight line of a width equal to or greater than a predefined length in the document. In the example illustrated in FIG. 4, there is no marker portion marked in green, and thus the marker detection section 105 does not detect the third marker portion and does not extract any text indicating the BCC address of the e-mail.

Moreover, yellow is previously set as the color corresponding to the subject of the e-mail. The marker detection section 105 detects, as the fourth marker portion, a yellow-colored straight line of a width equal to or greater than a predefined length in the document. Then the marker detection section 105 extracts, as a text indicating the subject of the e-mail, a text "Meeting on Monday" indicated in the fourth marker portion.

Moreover, orange is previously set as the color corresponding to the file name of the image data. The marker detection section 105 detects, as the fifth marker portion, an orange-colored straight line of a width equal to or greater than a predefined length in the document. Then the marker detection section 105 extracts, as a text indicating the file name of the image data, a text "Meeting" indicated in the fifth marker portion.

Note that the display section 130 displays a marker registration screen D1 illustrated in FIG. 6 under control by the operation control section 102. The marker registration screen D1 is provided with pull-down menus d1 to d5 for the TO address, the CC address, the BCC address, the subject, and the file name of the image data, respectively. The user can operate these pull-down menus d1 to d5 to thereby alter the colors respectively corresponding to the TO address, the CC address, the BCC address, and the subject of the e-mail and the file name of the image data. Upon receiving operation of the pull-down menus d1 to d5 by the operation reception section 103, the marker registration section 107 rewrites the maker color table stored in the storage section 160.

The marker registration screen D1 is also provided with reading registration buttons d6 to d10 for the TO address, the CC address, the BCC address, and the subject of the e-mail and the file name of the image data, respectively. Upon receiving operation of pressing the reading registration buttons d6 to d10 by the operation reception section 103, the marker registration section 107 causes the image reading section 110 to read the document loaded on the document loader 111. Then the marker registration section 107 causes the storage section 160 to store color information (RGB information) of the colors of the markers included in the image data acquired by the image reading section 110 and rewrites the marker color table. Consequently, even in a case where a color of a marker held by the user is not included in the pull-down menus provided on the marker registration screen D1, the user can register this color of the marker.

Referring back to FIG. 3, when no marker portion has been detected (NO in step S13), under control by the operation control section 102, the display section 130 displays a display screen indicating a result of the document reading (step S14). This display screen indicates the image data acquired through the document reading by the image reading section 110.

After processing in step S14, the operation control section 102 causes the storage section 160 to store the image data (step S15), and ends the document reading processing.

Figure 7A:
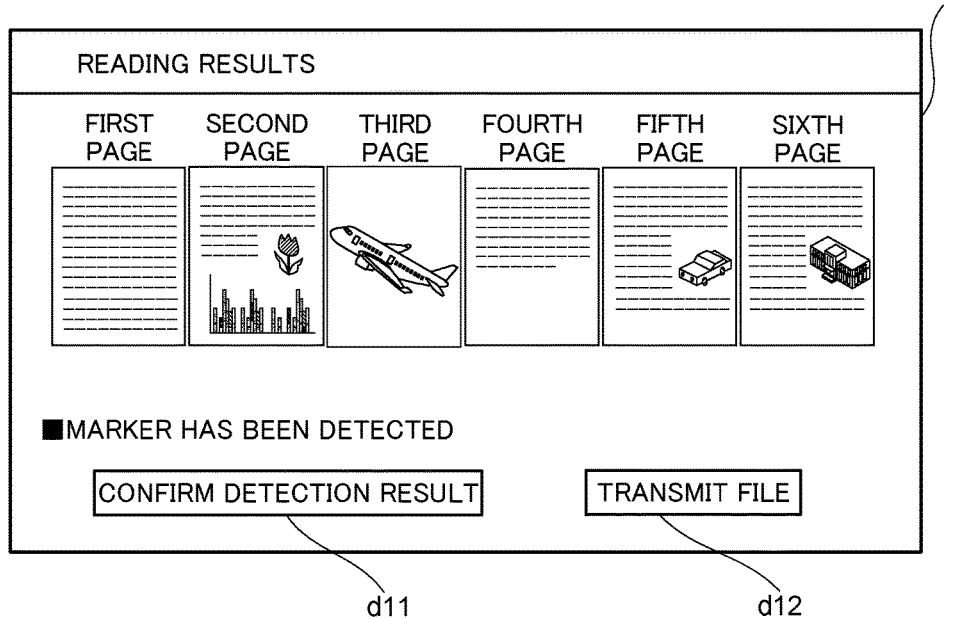
FIG. 7A is a diagram illustrating one example of a report screen displayed at the display section of the image reader as one example of the electronic device according to one embodiment of the invention, and [FIG. 7B] is a diagram illustrating one example of a text alternation screen displayed at the display section.

On the other hand, when any marker portion has been detected (YES in step S13), under control by the operation control section 102, the display section 130 displays a report screen indicating that the marker has been detected (step S16). FIG. 7A is a diagram illustrating one example of a report screen D2 displayed by the display section 130. The report screen D2 indicates, together with the image data acquired through the document reading by the image reading section 110, a text indicating that the marker has been detected.

Referring back to FIG. 3, when the operation reception section 103 has received, based on user operation, an instruction for confirming a marker detection result (YES in step S17), under control by the operation control section 102, the display section 130 displays a marker detection result confirmation screen (step S18). Then when the operation reception section 103 has received an instruction for altering the text extracted by the marker detection section 105 on this confirmation screen (YES in step S19), the marker detection section 105 receives a text obtained through the alteration made in accordance with the instruction received by the operation reception section 103 (step S20). After this processing in step S20, shift to processing of generating a file transmission screen (step S21) occurs.

On the other hand, when the operation reception section 103 has received no instruction for confirming the marker detection result (NO in step S17) or when the operation reception section 103 has received no instruction for altering the extracted text (NO in step S19), without executing the processing of altering the text in step S20, shift to the processing of generating the file transmission screen occurs (step S21).

Figure 7B:
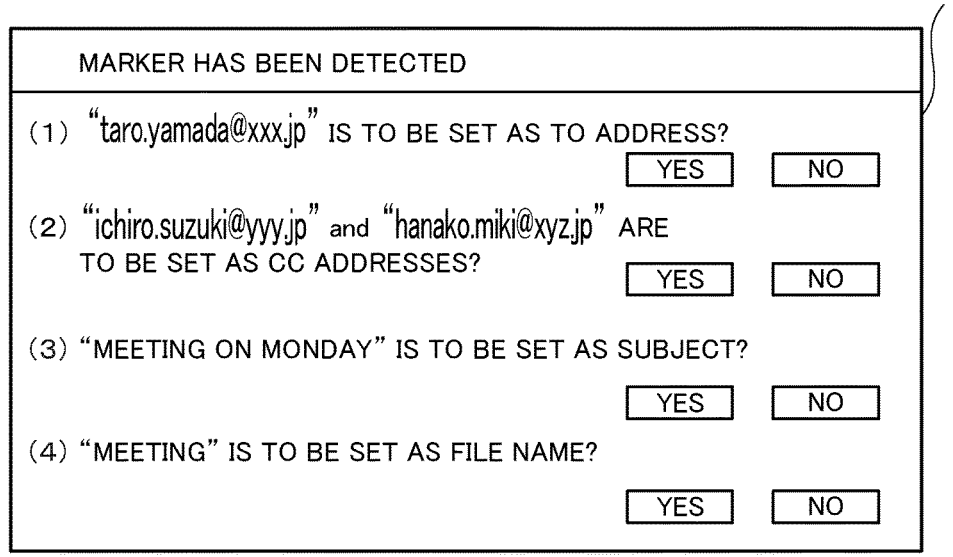

Here, in the example illustrated in FIG. 7A, the report screen D2 is provided with buttons d11 and d12. The operation reception section 103 receives operation of pressing the button d11 as the instruction for confirming the marker detection result. When the operation of pressing the button d11 has been performed, the display section 130 displays a text alteration screen D3 illustrated in FIG. 7B. In a case where the text extracted by the marker detection section 105 is the one not desired by the user, the user can press a "NO" button on this text alteration screen D3 to thereby alter contents of the text.

Referring back to FIG. 3, in the processing in step S21, the marker processing section 106 generates the file transmission screen by using the information indicated in the text extracted by the marker detection section 105. Then the display section 130 displays the file transmission screen generated through the processing in step S21 (step S22).

FIG. 8 is a diagram illustrating one example of a file transmission screen D4 displayed by the display section 130. The file transmission screen D4 is an e-mail transmission screen and provided with: a TO address input column d13 for receiving a TO address input instruction; a CC address input column d14 for receiving a CC address input instruction; a BCC address input column d15 for receiving a BCC address input instruction; a subject input column d16 for receiving a subject input instruction; a file name input column d17 for receiving a file name of the image data as an attached file; and a mail body text input column d18 for receiving a mail body text input instruction.

The texts detected through the processing in step S12 by the marker detection section 105 are previously inputted in the TO address input column d13, the CC address input column d14, the subject input column d16, and the file name input column d17, respectively. Consequently, it is possible for the user to specify a transmission address and a file name of the image data through the markings with the marker pens without inputting the transmission address and the file name of the image data by using, for example, the operation section 150.

Referring back to FIG. 3, when the operation reception section 103 has received a transmission instruction (YES in step S23), the marker processing section 106 causes the communication section 170 to transmit the e-mail (step S24). In the example illustrated in FIG. 8, when the operation reception section 103 has received selection of a transmit button d19, the marker processing section 106 generates mail data in accordance with the information inputted in each of the aforementioned input columns on the file transmission screen D4, and causes the communication section 170 to transmit this mail data.

As described above, with the image reader according to one embodiment of the invention, the marker detection section 105 detects the fifth marker portion marked with the predefined fifth color and the first marker portion marked with the predefined first color in the document, and also extracts the texts indicated in these fifth marker portion and the first marker portion. Then where the text indicated in the fifth marker portion is defined as the file name of the image data and the text indicated in the first marker portion is defined as the transmission address to which the image data is transmitted, the marker processing section 106 performs processing of transmitting the image data.

Consequently, it is possible to transmit the image data by specifying the transmission address and the file name of the image data through the markings with the markers without inputting the transmission address and the file name of the image data.

Moreover, the marker processing section 106 performs the processing of transmitting the image data as an attached file of the e-mail where the text indicated in the first marker portion is defined as the TO address.

Consequently, upon transmission of the image data, obtained through the document reading, via the e-mail, it is possible for the user to omit operation of selecting a file to be attached to the e-mail.

Moreover, the marker processing section 106 performs the processing of transmitting the image data where the text indicated in the second marker portion marked with the predefined second color is defined as the CC address of the e-mail and the text indicated in the third marker portion marked with the predefined third color is defined as the BCC address of the e-mail.

Consequently, it is possible for the user to specify attributes of the addresses such as the TO address, the CC address, and the BCC address by altering the colors of the markings.

Moreover, the marker processing section 106 performs the processing of transmitting the image data where the text indicated in the fourth marker portion marked with the predefined fourth color is defined as the subject f the e-mail.

Consequently, it is possible to transmit the image data by specifying the subject of the e-mail through the marking with the marker without inputting the subject of the e-mail.

Note that the invention is not limited to the configuration of the aforementioned embodiment and various modifications can be made thereto.

Modified Example 1

The embodiment has been described above, referring to a case where means for transmitting the image data acquired through the document reading is an e-mail. However, the invention is not necessarily limited to this case. The image data acquired through the document reading may be transmitted to a saving destination in the storage section 160.

In this case, the marker processing section 106 determines whether the text extracted by the marker detection section 105 is the address of the e-mail or a name of a region in the storage section 160 (directory name). More specifically, the marker processing section 106 analyzes the text indicated by the marker portion marked in the color (red, blue, or green) corresponding to the mail address. In a case where this text indicates a character, for example, an at mark (@), which is assumed to be included in the address of the e-mail, the marker processing section 106 determines that the text extracted by the marker detection section 105 is the address of the e-mail. On the other hand, in a case where this text indicates a character, for example, a slash mark (/), which is assumed to be included in the directory name, the marker processing section 106 determines that the text extracted by the marker detection section 105 is the directory name.

Then in a case where the text extracted by the marker detection section 105 is the e-mail address, the marker processing section 106 performs, as the processing of transmitting the image data, processing of transmitting the e-mail where this text is defined as the address of the e-mail.

On the other hand, in a case where the text extracted by the marker detection section 105 is the directory name, the marker processing section 106 performs, as the processing of transmitting the image data, processing of storing the image data in the region of this directory name.

As described above, with the image reader according to Modified Example 1, it is possible to execute processing of storing the image data, which has been obtained through the reading, into a desired region in the storage section 160 without inputting the directory name.

Modified Example 2

When the marker detection section 105 has detected a plurality of marker portions, the marker processing section 106 may perform the processing of transmitting the image data where a text obtained by linking together texts indicated in this plurality of marker portions is defined as the subject or the file name of the image data.

For example, in the example illustrated in FIG. 4, in a case where two portions "Meeting on Monday" and "Three will participate" are marked in yellow, the marker processing section 106 performs the processing of transmitting the image data where "Meeting on Monday. Three will participate." obtained by linking together "Meeting on Monday" and "Three will participate" is defined as the name of the image data.

As described above, with the image reader according to Modified Example 2, it is possible to specify the file name of the image data and the subject by using the plurality of texts indicated at separate positions in the document.

Modified Example 3

The embodiment has been described above, referring to a case where all the pages of the image data acquired by the image reading section 110 are transmitted as the attachment file of the e-mail. However, the invention is not necessarily limited to this case. The marker processing section 106 may perform processing of transmitting the image data of the pages not detected by the marker detection section 105 instead of transmitting all the pages of the image data. In this case, in the example illustrated in FIG. 4, the marker processing section 106 performs processing of transmitting the second to sixth pages of the image data excluding the first page of the image data.

In a case where the document marked by the user is used only for specifying the transmission address and the file name, there is no need of transmitting the image data indicating this document. In this point, with the image reader according to Modified Example 3, the image data indicating the document used only for specifying the transmission address and the file name can be removed from the data to be transmitted.

Moreover, the marker processing section 106 may divide the image data composed of the plurality of pages acquired by the image reading section 110 into: the image data composed of the pages where no maker has been detected by the marker detection section 105; and the image data composed of the pages where any maker has been detected by the marker detection section 105. Then the marker processing section 106 performs processing of transmitting these two pieces of divided image data. In the example illustrated in FIG. 4, the marker processing section 106 divides the image data illustrated in FIG. 4 into: the first image data composed of the second to sixth pages of images; and the second image data composed of the first page of the image, and performs processing of transmitting these first image data and second image data as attachment files of the e-mail.

Further, the marker detection section 105 may, upon the marker detection, determine whether or not a page number is indicated in a predefined region (for example, a top or a bottom of the page) of each page of the image data. Upon determination by the marker detection section 105 that the page number is indicated, the marker processing section 106 performs the processing of transmitting all the pages of the image data acquired by the image reading section 110, as is the case with the aforementioned embodiment. On the other hand, upon determination by the marker detection section 105 that no page number is indicated, the marker processing section 106 performs the processing of transmitting the pages of the image data not detected by the marker detection section 105 instead of transmitting all the pages of the image data, as is case with Modified Example 3 described above.

In a case where the documents are provided with consecutive pages, even the marked document is used only for specifying the transmission address and the file name with low possibility. Thus, performing the aforementioned processing makes it possible to transmit the image data of even the marked document in a case where this document is not a document used only for specifying the deliver address and the file name and not to transmit the image data of this document in a case where this document is a document used only for specifying the transmission address and the file name.

Modified Example 4

The embodiment has been described above, referring to a case where the marker detection section 105 determines, based on the color of the marker, to which marker portion (for example, the first marker portion or the second marker portion) the marker portion indicated in a different mode in the image data corresponds, but the invention is not necessarily limited to this case. The marker detection section 105 may determine, based on at least one of elements including the color of the marker, a line type of the marker, and a thickness of the marker, to which marker portion the marker portion indicated in the image data corresponds.

In this case, the storage section 160 previously stores a table indicating line types (for example, a solid line and a dotted line) of the markers and thicknesses of the markers respectively corresponding to the TC address, the CC address the BCC address, and the subject of the e-mail and the file name of the image data. With reference to this table stored in the storage section 160, the marker detection section 105 performs the aforementioned determination processing.

Modified Example 5

Moreover, based on any of the elements, including the color of the marker, the line type of the marker, and the thickness of the marker, specified by the user, the marker detection section 105 may determine to which marker portion (for example, the first marker portion or the second marker portion) the marker portion indicated in the different mode in the image data corresponds.

In accordance with user operation inputted by using the operation section 150 or the touch panel function, the operation reception section 103 receives an instruction for selecting one or a plurality of the elements including the color of the marker, the line type of the marker, and the thickness of the marker. Then the marker detection section 105 performs the aforementioned determination processing based on the element which the marker detection section 105 has received the instruction for selecting. For example, upon receiving the instruction for selecting the element: the line type of the marker by the operation reception section 103, the marker detection section 105 performs the aforementioned determination processing based on only the element: the line type of the marker and does not perform the aforementioned determination processing based on the elements: the color of the marker and the thickness of the marker. That is, in a case where the two marker portions have the same line type of the markers while having the different colors of the markers and the different thicknesses of the markers, the marker detection section 105 determines that the two marker portions are the same (the first marker portions or the second marker portions).

Performing processing as described above makes it possible to mark a line determined to be located in the same marker portion even in a case where, for example, he or she used to draw a line with a red marker but now has only a blue marker in his or her hand.

Modified Example 6

The embodiment has been described above, referring to a case where the marker processing section 106 performs the processing by extracting, from the marker portions, the texts indicating the TO address, the CC address, the BCC address, the subject, and the file name of the image data, but the invention is not necessarily limited to this case.

The marker processing section 106 may perform the processing of transmitting the image data by extracting, as a body text of the e-mail, a text indicated in a sixth marker portion indicated in a mode different from modes of the aforementioned first to fifth marker portions and using this extracted text as the body text of the e-mail.

Modified Example 7

Without directly transmitting the image data acquired by the image reading section 110, the marker processing section 106 may perform some processing thereon and transmit this processed image data.

For example, the marker processing section 106 may perform processing of removing, from the image data acquired by the image reading section 110, the marking indicated in the marker portion detected by the marker detection section 105 and transmit the image data subjected to the aforementioned removal.

Moreover, the marker processing section 106 may generate, for the image data acquired by the image reading section 110, data (for example, document data or a portable document format (PDF) data) obtained by adding, as so-called metadata, for example, information indicating that the text indicated in the first marker portion is the file name of the image data and the text indicated in the second marker portion is the transmission address to which the image data is transmitted and then transmit this generated data.

The invention claimed is:

1. An electronic device comprising:
an acquisition section acquiring image data indicating a document; and
a control unit including a processor, and, as a result of execution of a program, functioning as:
a marker detection section analyzing the image data and detecting a first marker portion indicated in the image data and a second marker portion indicated in the image data in a mode different from a mode of the first marker, the marker detection section also extracting texts indicated in the first marker portion and the second marker portion;
a marker processing section performing processing of transmitting the image data where the text indicated in the first marker portion is defined as a file name of the image data and the text indicated in the second marker portion is defined as a transmission address to which the image data is transmitted; and
an operation reception section receiving an instruction for selecting, in accordance with user operation, one or a plurality of elements out of elements including a color of a marker, a line type of the marker, and a thickness of the marker, wherein
based on the element which the operation reception section has received the instruction for selecting, the marker detection section determines whether the marker portion indicated in the image data is the first marker portion or the second marker portion.

2. The electronic device according to claim 1, further comprising a communication section that performs communication with an information processor via a network, wherein
the marker processing section performs, through the communication section, the processing of transmitting the image data as an attached file of an e-mail where the text indicated in the second marker portion is defined as a TO address.

3. The electronic device according to claim 2, wherein
the marker processing section performs, through the communication section, the processing of transmitting the image data where a text indicated in a third marker portion in a mode different from the modes of the first marker portion and the second marker portion is defined as a CC address of the e-mail and a text indicated in a fourth marker portion in a mode different from the modes of the first marker portion, the second marker portion, and the third marker portion is defined as a BCC address of the e-mail.

4. The electronic device according to claim 2, wherein
the marker processing section performs, through the communication section, the processing of transmitting the image data where a text indicated in a fifth marker portion in a mode different from the modes of the first marker portion and the second marker portion is defined as a subject of the e-mail.

5. The electronic device according to claim 2, wherein
the marker processing section performs, through the communication section, the processing of transmitting the image data where a text indicated in a sixth marker portion in a mode different from the modes of the first marker portion and the second marker portion is defined as a body text of the e-mail.

6. The electronic device according to claim 2, further comprising a storage section, wherein
the marker processing section determines whether the text indicated in the second marker portion is an address of the e-mail or a name of a region in the storage section built in the electronic device,
in a case where the text indicated in the second marker portion is the address of the email, the marker processing section performs, through the communication section, as the processing of transmitting the image data, processing of transmitting the e-mail where the just-mentioned text is defined as the address of the e-mail, and
in a case where the text indicated in the second marker portion indicates the region in the storage section built in the electronic device, the marker processing section performs, as the processing of transmitting the image data, processing of storing the image data in the region.

7. The electronic device according to claim 1, wherein
upon detection of a plurality of the second marker portions by the marker detection section, where texts indicated in the plurality of second marker portions are defined as transmission addresses to which the image data is transmitted, the marker processing section performs the processing of transmitting the image data to the plurality of the transmission addresses.

8. The electronic device according to claim 1, wherein in a case where the image data acquired by the acquisition section is composed of a plurality of pages, the marker processing section performs the processing of transmitting the image data for any page, out of the plurality of pages, on which no marker has been detected by the marker detection section.

9. The electronic device according to claim 1, wherein in a case where the image data acquired by the acquisition section is composed of a plurality of pages, the marker processing section divides the image data composed of the plurality of pages into: first image data composed of the pages on which no marker has been detected by the marker detection section; and second image data composed of the pages on which any marker has been detected by the marker detection section, and performs processing of transmitting the first image data and the second image data obtained through the division.

10. The electronic device according to claim 1, wherein based on the color of the marker as the element which the operation reception section has received the instruction for selecting, the marker detection section determines whether the marker portion indicated in the image data is the first marker portion or the second marker portion, the electronic device further comprising:

a display section; and the control unit further functions as a marker registration section causing the display section to display a marker registration screen for receiving alteration of a first color corresponding to the first marker portion and a second color corresponding to the second marker portion, and also altering the first color and the second color in accordance with user operation performed on the marker registration screen.

11. The electronic device according to claim 10, wherein the acquisition section is an image reading section reading the document to acquire the image data, and in accordance with the user operation performed on the marker registration screen, the marker registration section causes the mage reading section to read the document and alters either of the first color and the second color to a color indicated in the image data acquired through the document reading by the reading section.

12. The electronic device according to claim 1, wherein the marker processing section removes, from the image data acquired by the acquisition section, markings indicated in the first marker portion and the second marker portion detected by the marker detection section, and performs processing of transmitting the image data subjected to the removal.

13. The electronic device according to claim 1, wherein the marker processing section generates data obtained by adding, to the image data acquired by the acquisition section, information indicating that the text indicated in the first marker portion is the file name of the image data and the text indicated in the second marker portion is the transmission address to which the image data is transmitted, and performs processing of transmitting the generated data.

14. An electronic device comprising:

an acquisition section acquiring image data indicating a document;

a storage section;

a communication section performing communication with an information processor via a network; and a control unit including a processor, and, as a result of execution of a program, functioning as:

a marker detection section analyzing the image data and detecting a first marker portion indicated in the image data and a second marker portion indicated in the image data in a mode different from a mode of the first marker, the marker detection section also extracting texts indicated in the first marker portion and the second marker portion; and a marker processing section performing processing of transmitting the image data where the text indicated in the first marker portion is defined as a file name of the image data and the text indicated in the second marker portion is defined as a transmission address to which the image data is transmitted, wherein the marker processing section is capable of performing, through the communication section, the processing of transmitting the image data as an attached file of an e-mail where the text indicated in the second marker portion is defined as a TO address, the marker processing section determines whether the text indicated in the second marker portion is an address of the e-mail or a name of a region in the storage section built in the electronic device, in a case where the text indicated in the second marker portion is the address of the email, the marker processing section performs, through the communication section, as the processing of transmitting the image data, processing of transmitting the e-mail where the just-mentioned text is defined as the address of the e-mail, and in a case where the text indicated in the second marker portion indicates the region in the storage section built in the electronic device, the marker processing section performs, as the processing of transmitting the image data, processing of storing the image data in the region.

15. An electronic device comprising:

an acquisition section acquiring image data indicating a document; and a control unit including a processor, and, as a result of execution of a program, functioning as:

a marker detection section analyzing the image data and detecting a first marker portion indicated in the image data and a second marker portion indicated in the image data in a mode different from a mode of the first marker, the marker detection section also extracting texts indicated in the first marker portion and the second marker portion; and a marker processing section performing processing of transmitting the image data where the text indicated in the first marker portion is defined as a file name of the image data and the text indicated in the second marker portion is defined as a transmission address to which the image data is transmitted, wherein upon detection of a plurality of the first marker portions by the marker detection section, where a text obtained by linking together texts indicated in the plurality of first marker portions is defined as the file name of the image data, the marker processing section performs the processing of transmitting the image data.

16. A maker processing method comprising:

an acquisition step of acquiring image data indicating a document;

a marker detection step of analyzing the image data and detecting a first marker portion indicated in the image data and a second marker portion indicated in the image data in a mode different from a mode of the first marker, and extracting texts indicated in the first marker portion and the second marker portion;

a marker processing step of performing processing of transmitting the image data where the text indicated in the first marker portion is defined as a file name of the image data and the text indicated in the second marker portion is defined as a transmission address to which the image data is transmitted; and an operation reception step of receiving an instruction for selecting, in accordance with user operation, one or a plurality of elements out of elements including a color of a marker, a line type of the marker, and a thickness of the marker, wherein based on the element which the instruction for selecting has been received in the operation reception step, it is determined in the marker detection step whether the marker portion indicated in the image data is the first marker portion or the second marker portion.

\* \* \* \* \*